US010359765B2

(12) United States Patent
Nakaya et al.

(10) Patent No.: US 10,359,765 B2
(45) Date of Patent: Jul. 23, 2019

(54) CONTROL DEVICE FOR MACHINE TOOL WITH MULTI-SYSTEM PROGRAMS (71) Applicants: CITIZEN WATCH CO., LTD., Tokyo (JP); CITIZEN MACHINERY CO., LTD., Nagano (JP)

(72) Inventors: Takaichi Nakaya, Higashimurayama (JP); Hitoshi Matsumoto, Kawagoe (JP)

(73) Assignees: CITIZEN WATCH CO., LTD., Tokyo (JP); CITIZEN MACHINERY CO., LTD., Nagano (JP)

( * ) Notice: Subject to any disclaimer, the term of this patent is extended or adjusted under 35 U.S.C. 154(b) by 0 days.

(21) Appl. No.: 15/517,066

(22) PCT Filed: Oct. 5, 2015

(86) PCT No.: PCT/JP2015/078187
§ 371 (c)(1),
(2) Date: Apr. 5, 2017

(87) PCT Pub. No.: WO2016/056504
PCT Pub. Date: Apr. 14, 2016

(65) Prior Publication Data
US 2017/0293288 A1 Oct. 12, 2017

(30) Foreign Application Priority Data

Oct. 7, 2014 (JP) .................. 2014-206662

(51) Int. Cl.
G05B 19/4155 (2006.01)
B23Q 39/04 (2006.01)
G05B 19/418 (2006.01)

(52) U.S. Cl.
CPC ......... G05B 19/4155 (2013.01); B23Q 39/04 (2013.01); G05B 19/41865 (2013.01);
(Continued)

(58) Field of Classification Search
None
See application file for complete search history.

(56) References Cited

U.S. PATENT DOCUMENTS 5,127,140 A * 7/1992 Oiwa .................. B23B 3/167
29/27 C
5,453,933 A 9/1995 Wright et al.
(Continued)

FOREIGN PATENT DOCUMENTS

CN 1737716 A 2/2006
CN 101169647 A 4/2008
(Continued)

OTHER PUBLICATIONS

Chinese Office Action dated Mar. 3, 2016, in reference to Application Nos. 201580054330.1, in 5 pages.
(Continued)

Primary Examiner — Bernard G Lindsay
(74) Attorney, Agent, or Firm — Knobbe, Martens, Olson & Bear LLP (57) ABSTRACT A control device for a machine tool to produce a plurality of different-shaped products efficiently and successively is provided. In the control device, each driving shaft of modules is assigned to different control systems. The device includes a multi-system program storage part for storing a plurality of multi-system programs to machine a workpiece in different shapes, a multi-system program dividing part for dividing the multi-system programs into machining programs, a divided program storage part for storing the divided machining programs individually, a system-based program storage part for storing the machining programs for the respective control systems, and a machining program selection part for selecting the machining program from the divided program storage part in accordance with the machining step to be executed and for storing the selected machin-
(Continued)

ing program in the system-based program storage part for the respective control systems.

7 Claims, 10 Drawing Sheets

(52) U.S. Cl.
CPC ............ *G05B 2219/32043* (2013.01); *G05B 2219/50008* (2013.01); *G05B 2219/50012* (2013.01); *G05B 2219/50014* (2013.01); *Y02P 90/20* (2015.11)

(56) References Cited

U.S. PATENT DOCUMENTS

| | | | |
|---|---|---|---|
| 6,999,841 | B1 | 2/2006 | Rutkowski |
| 7,043,332 | B1* | 5/2006 | Fujinawa ............... B23B 3/168 700/159 |
| 2003/0014151 | A1 | 1/2003 | Nigazawa et al. |
| 2004/0167658 | A1* | 8/2004 | Nagashima ........ G05B 19/4155 700/159 |
| 2009/0198367 | A1 | 8/2009 | Matsumoto |
| 2009/0198370 | A1* | 8/2009 | Nishi ............... G05B 19/41815 700/184 |
| 2011/0093666 | A1* | 4/2011 | Endo .................. G05B 19/4155 711/154 |
| 2011/0158775 | A1 | 6/2011 | Ando et al. |
| 2013/0173045 | A1 | 7/2013 | Kawana et al. |
| 2013/0331956 | A1 | 12/2013 | Kasuya |
| 2014/0107847 | A1 | 4/2014 | Shang et al. |
| 2014/0236340 | A1 | 8/2014 | Terada et al. |
| 2015/0286574 | A1* | 10/2015 | Endou ................ G06F 12/0875 712/225 |

FOREIGN PATENT DOCUMENTS

| | | |
|---|---|---|
| CN | 102880153 A | 1/2013 |
| CN | 103189807 A | 7/2013 |
| EP | 1224512 B1 | 1/2007 |
| EP | 131999 A1 | 6/2009 |
| JP | 2-211503 | 8/1990 |
| JP | 3-270850 | 12/1991 |
| JP | 2004-139232 | 5/2004 |
| TW | 475911 | 2/2002 |
| TW | 483794 | 4/2002 |
| TW | M395532 U1 | 1/2011 |
| TW | M467530 U | 12/2013 |
| TW | I448853 B | 8/2014 |
| WO | WO 2010/004961 | 1/2010 |

OTHER PUBLICATIONS

Extended European Search Report dated May 3, 2018 (Application No. 15849606.7).
International Search Report issued in PCT Application No. PCT/JP2015/078187 dated Nov. 17, 2015 in 1 page.
Taiwanese Office Action, Application No. 104133037, dated Oct. 19, 2018.

* cited by examiner

| $1 | $2 | $3 |
|---|---|---|
| G50 Z0 | | |
| G630 | G630 | G630 |
| | G632 | G632 |
| M06 | | |
| G00 Z-0.5 | | |
| M03 S1=4000 G99 | M23 S2=4000 G99 | |
| T0600 | | |
| | T2200 | |
| G00 X13.0 Z-0.5 | G00 X13.0 Z-1.0 | |
| X-3.0 | X-30.0 | |
| G01 Z2.5 F0.06 T06 | G01 Z2.5 F0.06 T22 | |
| . | . | |
| . | . | |
| . | . | |
| . | . | |
| . | . | |
| . | . | |
| . | M72 | |
| . | G04 U1.0 | |
| . | M11 | |
| . | M73 | |
| . | M33 T2500 H4320 | |
| . | | |
| . | | |
| . | | |
| . | | |
| . | | |
| . | | |
| N999 | N999 | N999 |
| M02 | M02 | M02 |
| M99 | M99 | M99 |
| % | % | % |

FIG.5A PRODUCT A

FIG.5B PRODUCT B

FIG.5C PRODUCT C

FIG.5D PRODUCT D

| M1 | M2 | M3 |
|---|---|---|
| PRODUCT A(1) | | |
| PRODUCT A(1) | PRODUCT A(2) | |
| PRODUCT A(1) | PRODUCT A(2) | PRODUCT A(3) |
| PRODUCT A(1) | PRODUCT A(2) | PRODUCT A(3) |
| ⋮ | ⋮ | ⋮ |

FIG7B

| M1 | M2 | M3 |
|---|---|---|
| PRODUCT A(1) | | |
| PRODUCT B(1) | PRODUCT A(2) | |
| PRODUCT C(1) | PRODUCT B(2) | PRODUCT A(3) |
| PRODUCT D(1) | PRODUCT C(2) | PRODUCT B(3) |
| ⋮ | ⋮ | ⋮ |

FIG.9B

CONTROL DEVICE FOR MACHINE TOOL WITH MULTI-SYSTEM PROGRAMS

CROSS-REFERENCE TO RELATED APPLICATIONS

This application is the U.S. National Phase under 35 U.S.C. § 371 of International Application No. PCT/JP2015/078187, filed Oct. 5, 2015, which claims priority to Japanese Patent Application No. 2014-206662, filed Oct. 7, 2014. The entire contents of these applications are incorporated herein by reference.

TECHNICAL FIELD

This invention is related to a control device for a machine tool which controls machining operation on a workpiece in accordance with a machining program.

BACKGROUND ART

A machine tool (a conventional workpiece machining apparatus) is provided with a plurality of modules each installed on a bed of the machine tool and including a main spindle for gripping a workpiece and a tool holder for holding a tool for machining the workpiece gripped by the main spindle. Such a conventional machine tool machines the workpiece while transferring the workpiece among the plurality of the modules (see WO2010/004961 A1).

Further, a conventional control device includes a plurality of control systems for controlling a driving shaft of the machine tool and operates the machine tool by executing a multi-system program. Here, the multi-system program of the conventional control device includes a plurality of machining programs corresponding to the plurality of control systems respectively. With the conventional control device, therefore, each of the control systems is assigned to each of the modules, and each of the modules is controlled by executing a machining program of the corresponding control system assigned to the module.

Technical Problem

The above-mentioned conventional machine tool is capable of producing, for example, the same-shaped products with a plurality of machining steps successively and efficiently by machining the workpieces while transferring the workpieces among the plurality of modules.

For instance, when a product having a predetermined shape is produced by three (3) machining steps using an automatic lathe having three modules; the first module may perform a first machining step with a machining program of a first system, the second module may perform a second machining step with a machining program of a second system, and the third module may execute a third machining step with a machining program of a third system so as to produce the product.

In this case, it is more efficient to successively produce the same-shaped products by executing the second machining step on the second product with the second module and the first machining step on the third product with the first module simultaneously while executing the third machining step on the first product with the third module after the first machining step and the second machining step on the first product are subsequently executed by the first module and the second modules.

However, the conventional control device is configured to replace the machining programs for the entire multi-system program. That is, in order to produce different-shaped products, such as a product A, a product B, and a product C each requiring a plurality (e.g., three) of machining steps, a different multi-system program is required for each product. Therefore, when the third machining step for the product A is being executed by the third module, it is unable to replace the multi-system program for the product A with a multi-system program for the product B or for the product C.

In other words, when the third module is executing the third machining step for the product A, the second module is unable to execute the second machining step for the product B and the first module is unable to execute the first machining step for the product C. Hence, in order to produce different products (e.g., the product A, the product B, and the product C) sequentially and successively with the conventional control device for machine tool, it is necessary to wait for completion of the production of the product A performed by the first to third modules before replacing the multi-system program for the product A with the multi-system program for the product B and commencing the production of the product B using the first to third modules. Similarly, it is necessary to wait for completion of the production of the product B before replacing the multi-system program for the product B with the multi-system program for the product C and commencing the production of the product C using the first to third modules.

As explained above, the conventional control device has a drawback in which the operation stop time of a module may be prolonged and thus it becomes unable to efficiently produce a plurality of different-shaped products successively.

An object of this invention is, therefore, to provide a control device for a machine tool that can efficiently produce a plurality of different-shaped products successively.

Solution to Problem

In order to achieve the object, in a control device for machine tool according to the invention, the machine tool includes a plurality of modules each integrally including a workpiece gripper that grips a workpiece and an operation-part holder that holds an operation part configured to perform a predetermined operation on the workpiece gripped by the workpiece gripper. The control device includes a plurality of control systems that are configured to control a driving shaft of the machine tool, the control device controlling the machine tool to machine the workpiece in accordance with a multi-system program, the multi-system program including a plurality of machining programs which respectively correspond to the control systems; a multi-system program storage part that is configured to store a plurality of the multi-system programs, the driving shaft of each of the modules being assigned to each of the control systems, and each of the plurality of multi-system programs being executed to machine the workpiece in a different shape; a multi-system program dividing part that is configured to divide each of the multi-system programs into the machining programs; a divided program storage part that is configured to individually store the divided machining programs; a system-based program storage part that is configured to store each of the machining programs for the respective control systems; and a machining program selection part that is configured to select and retrieve a desired machining program from the divided program storage part in accordance with the machining step to be executed by each of the modules and to store the selected machining program in the system-based program storage part for the respective control systems. The machining program selection part selects and retrieves the machining program for each control system from the divided program storage part and stores the selected machining program in the system-based program storage part for the respective control systems such that each of the modules independently executes a predetermined machining step.

DESCRIPTION OF EMBODIMENT

Figure 1:
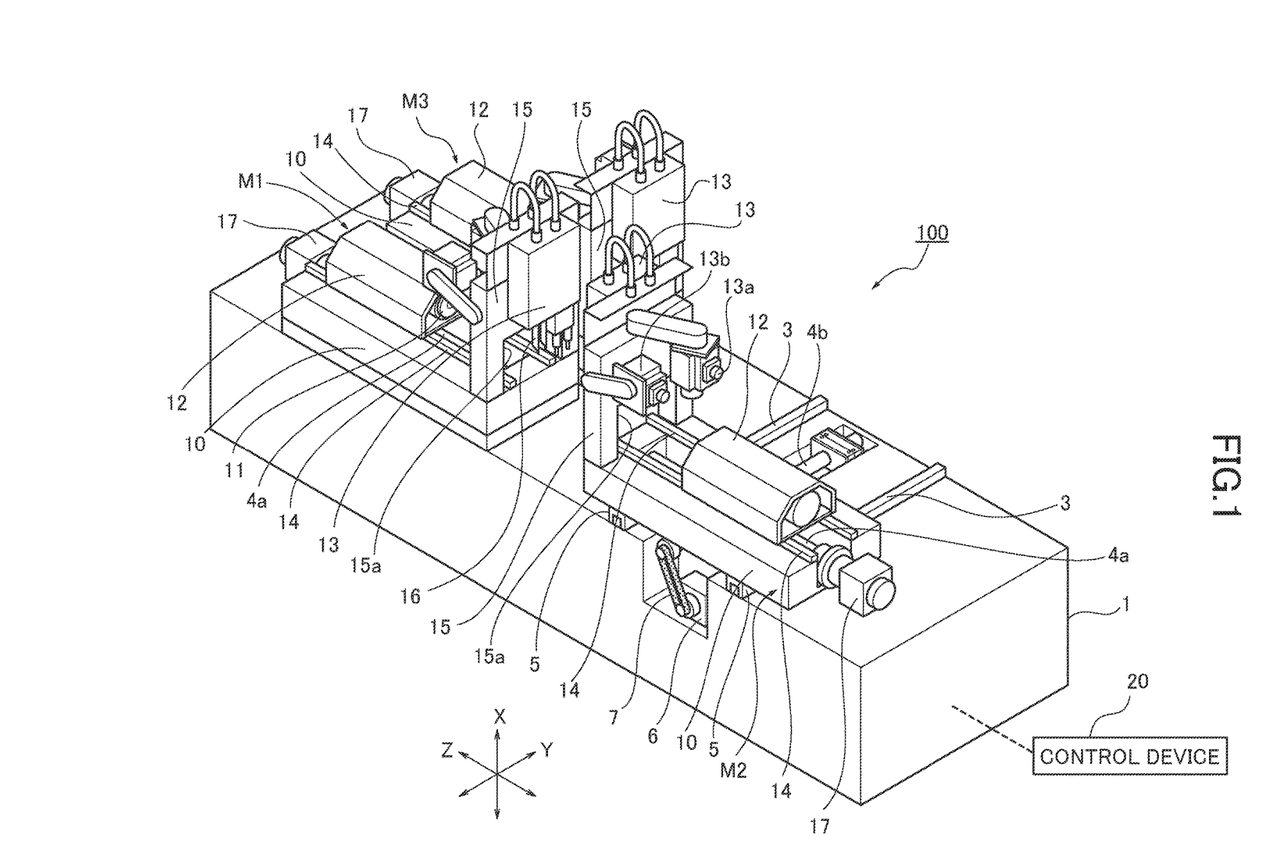
FIG. 1 is a perspective view illustrating an overall configuration of a machine tool that includes a control device according to an embodiment of the present invention.

As illustrated in FIG. 1, a machine tool (automatic lathe) 100 includes a control device according to an embodiment of the present invention. The machine tool 100 includes a bed 1 on which three modules M1, M2, and M3 are installed as machining units. Hereinafter, the axial directions of the main spindles 11 of the modules M1, M2, and M3 represent a Z-axial direction. Further, a direction orthogonal to the Z-axis direction in the horizontal direction represents a Y-axis direction, and a direction orthogonal to both the Z-axis and the Y-axis (i.e., the vertical direction) represents an X-axis direction.

The basic configurations of the modules M1, M2, and M3 are identical to each other. That is, each of the modules M1, M2, and M3 is integrally provided with a spindle headstock 12 that supports a main spindle 11 and a tool post 13 that holds tools 16 to machine a workpiece gripped by the main spindle 11 on a base plate 10.

A known built-in motor (not illustrated) is installed between the main spindle 11 and the spindle headstock 12 and rotates the main spindle 11 around the axis thereof. The main spindle 11 includes a main spindle chuck (not illustrated) at an end portion of the main spindle 11 and removably grips the workpiece by opening and closing the chuck.

On each of the base plates 10, two guiderails 14 extending in the Z-axis direction are laid in parallel to the Y-axis direction, and the spindle headstock 12 is placed on the guiderails 14. The spindle headstock 12 is screwed to a ball screw 4a which is installed between the two guiderails 14. The ball screw 4a is rotated by a motor 17, and therefore the spindle headstock 12 moves forward and backward together with the main spindle 11 on the guiderails 14 in the Z-axis direction.

On the base plates 10, support tables 15 are fixed at the front parts of the spindle headstocks 12. The tool posts 13 are installed at the front sides of the support tables 15 so as to be movable in the X-axis direction and the Y-axis direction. The tool posts 13 are moved in the X-axis direction and the Y-axis direction by the corresponding X-axis motors 13a and the corresponding Y-axis motors 13b.

The support tables 15 are each formed in a gate shape having an opening part 15a, and the spindle headstocks 12 can pass through the corresponding opening parts 15a. The spindle headstocks 12 are configured to pass through the opening parts 15a of the support tables 15 so as to position the workpieces gripped by the main spindles 11 to face the corresponding tool posts 13 installed at the front sides of the support tables 15.

Under the control of the control device 20 (explained later), each of the modules M1, M2, and M3 grips the workpiece by the main spindle 11 and controls to rotate the main spindle 11, to move the spindle headstock 12 in the Z-axis direction, and to move the tool post 13 in the X-axis direction and the Y-axis direction. Accordingly, each of the modules M1, M2, and M3 is able to machine the workpiece into a predetermined shape by selecting desired tools 16 on the tool post 13. Here, each of the modules M1, M2, and M3 functions as an independent lathe. In other words, the machine tool 100 is configured by combining a plurality of lathes as the modules.

Two (2) modules M1 and M3 are arranged such that the Z-axis directions thereof are aligned in parallel to the Y-axis direction, and the base plates 10 are fixed to the bed 1. That is, the modules M1 and M3 are provided to be unmovable with respect to the Y-axis direction (hereinafter, the modules M1 and M3 are also referred to as "the fixed modules M1 and M3"). Two guiderails 3 are also laid on the bed 1 to face the fixed modules M1 and M3. The guiderails 3 extends in the Y-axis direction and laid in parallel to the Z-axis direction.

The base plate 10 of the module M2 is fixed to a slider 5 which is movably provided on the guiderails 3. The module M2 is thus supported on the guiderails 3 to be reciprocally movable in the Y-axis direction along the guiderails 3 (hereinafter, the module M2 is also referred to as "the moving module M2").

A ball screw 4b is provided between the guiderails 3, and the base plate 10 of the moving module M2 is screwed to the ball screw 4b. The ball screw 4b is connected to a driving motor 6 through a belt 7. By rotating the driving motor 6, the ball screw 4b is rotated through the belt 7 and the moving module M2 is reciprocally moved in the Y-axis direction along the guiderails 3.

In the above-mentioned machine tool 100, the moving module M2 faces the fixed modules M1 and M2, and is possible to move to a position where the main spindles thereof are aligned with each other. That is, the moving module M2 is moved to a position where the main spindle of the moving module M2 is aligned with the main spindle of the fixed module M1 or M2, and each of the spindle headstocks 12 is moved toward a direction to approach each other. With this, the machine tool 100 is able to machine the workpiece while transferring the workpiece among the moving module M2 and the fixed modules M1 and M3.

In each of the modules M1, M2, and M3 of this embodiment, the main spindle 11 for gripping a workpiece represents a workpiece gripper that grips a workpiece, the tools 16 for machining the workpiece gripped by the main spindle represents an operation part that performs a predetermined operation on the workpiece gripped by the workpiece gripper, and the lathe module including the tool post 13 for holding the tools 16 represents an operation-part holder that holds the operation part. However, this is only an example, and the machine tool may include a machining module for grinding, milling, gear cutting, or the like.

Figure 2:
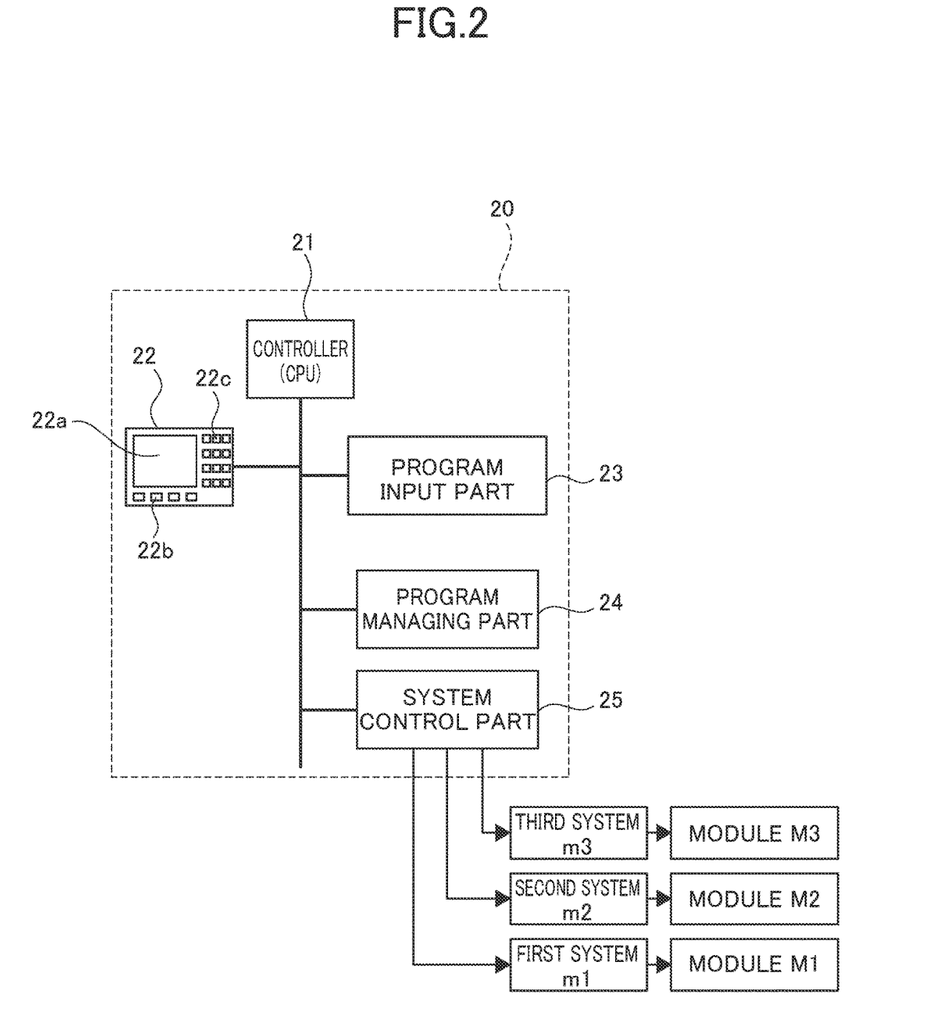
FIG. 2 is a block diagram illustrating the control device for a machine tool according to the embodiment of the present invention.

The machine tool 100 includes the control device 20 and is controlled by the control device 20. As illustrated in FIG. 2, the control device 20 includes a controller (CPU) 21, an operation panel 22, a program input part 23, a program managing part 24, and a system control part 25.

The control device 20 of this embodiment includes three (3) control systems (a first system m1, a second system m2, and a third system m3). A driving shaft of each of the modules M1, M2, and M3 is respectively and independently assigned to each of the control systems. Each of the modules M1, M2, and M3 is controlled by the control device 20 based on a multi-system program stored (recorded) in the program managing part 24.

Figure 3:
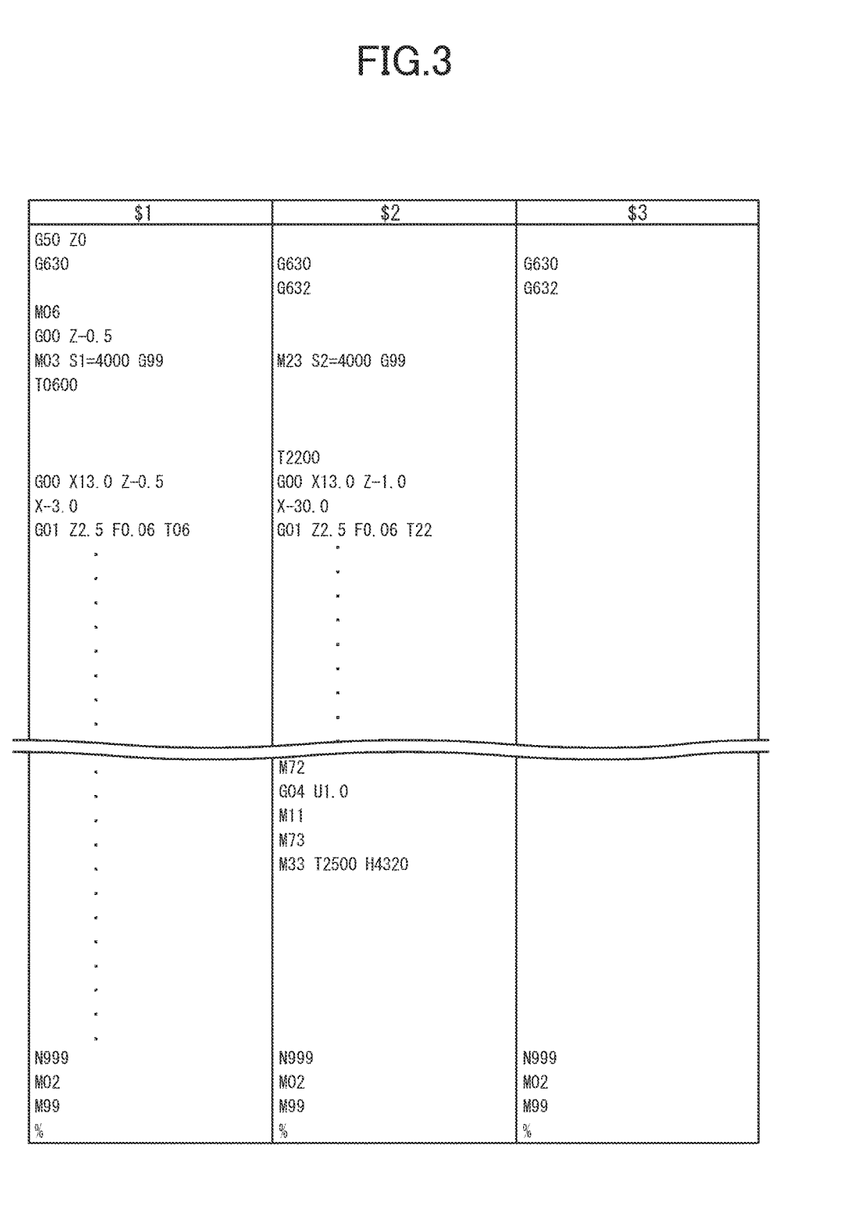
FIG. 3 is a view for showing an example of a multi-system program containing machining programs recorded in recording areas $1, $2, and $3.

The multi-system program includes a plurality of machining programs that respectively correspond to the control systems (i.e., the first system m1, the second system m2, and the third system m3). The multi-system program of this embodiment contains three (3) recording areas $1, $2, and $3. Each of the recording areas $1, $2, and $3 respectively records the machining program of the corresponding system. As illustrated in FIG. 3, the multi-system program is formed as a single program that contains the three (3) recording areas $1, $2, and $3 arranged in parallel or the recording areas $1, $2, and $3 arranged in series. A machining program corresponding to the first system m1 is recorded in the recording area $1, a machining program corresponding to the second system m2 in the recording area $2, and a machining program corresponding to the third system m3 in the recording area $3. It should be noted that a multi-system program may be configured by connecting and associating the plurality of the recorded machining programs in accordance with a predetermined associating manner. In this case, the machining programs each recorded in the corresponding recording areas $1, $2, and $3 are recorded in the connected machining programs.

The controller 21 independently controls the control systems (i.e., the first system m1, the second system m2, and the third system m3) in accordance with the corresponding machining programs of the multi-system program.

In this embodiment, the driving shafts of the module M1 are assigned to the first system m1; the driving shafts of the module M2, which also includes the driving shaft of the ball screw 4b, are assigned to the second system m2; and the driving shafts of the module M3 are assigned to the third system m3. Accordingly, the controller 21 controls the module M1 by the first system m1, controls the module M2 to, for example, move the module M2 in the Y-axis direction by the second system m2, and controls the module M3 by the third system m3. With this, the controller 21 entirely controls the machine tool 100 and also controls the entire workpiece-machining operation performed by the modules M1, M2, and M3.

The operation panel 22 includes a display 22a, an operation button 22b, and a keyboard 22c. The display 22a displays, for example, the operation status of the machine tool 100 and operation commands to the machine tool 100. The operation button 22b and the keyboard 22c are operated to input a desired operation.

Figure 4:
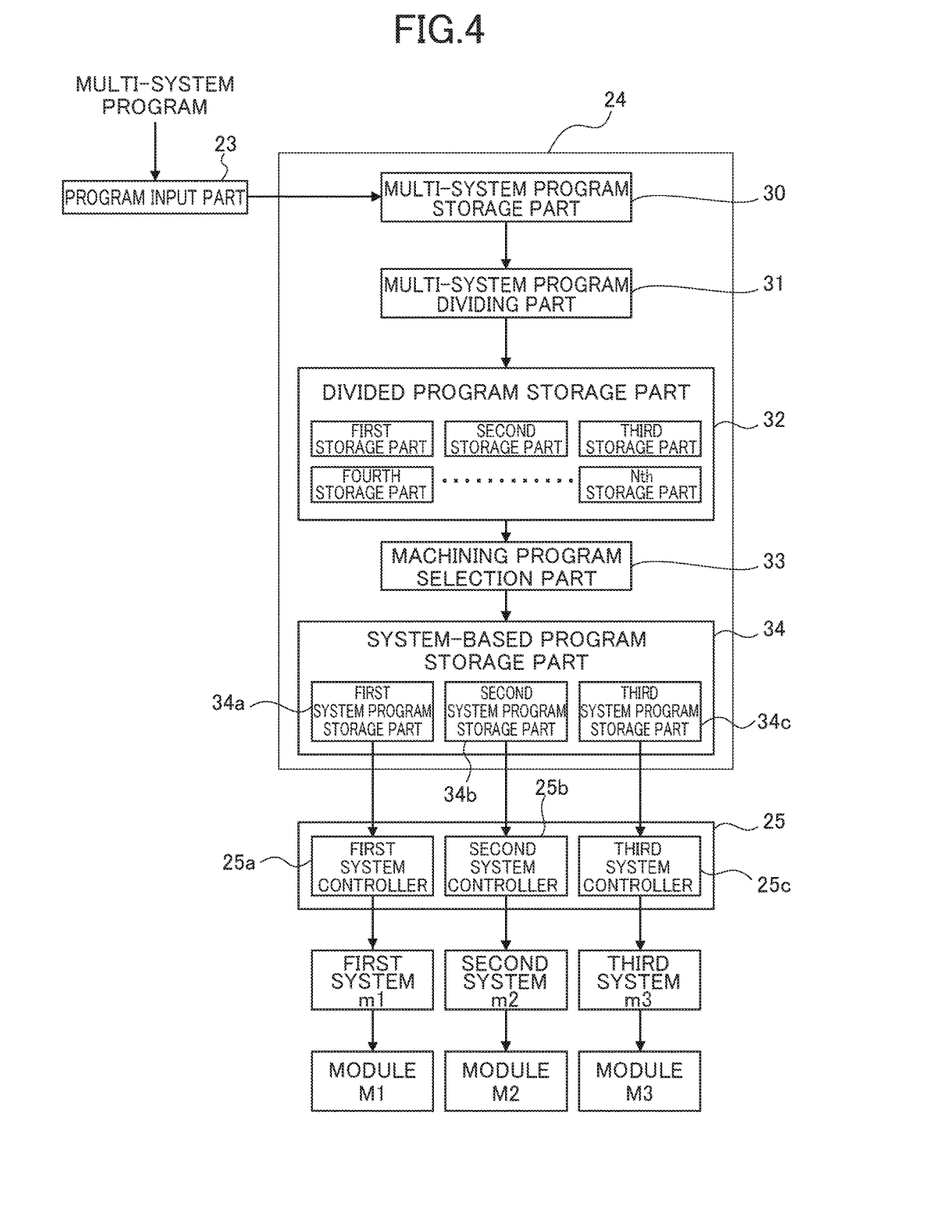
FIG. 4 is a block diagram illustrating a program managing part of the control device.

As illustrated in FIG. 4, the program managing part 24 includes a multi-system program storage part 30, a multi-system program dividing part 31, a divided program storage part 32, a machining program selection part 33, and a system-based program storage part 34.

The multi-system program is programmed by an external computer and/or the operation panel 22 and stored (recorded) in the multi-system program storage part 30 through the program input part 23. The multi-system program may include machining programs for the control systems (the first system m1, the second system m2, and the third system m3) to control the corresponding modules M1, M2, and M3. For instance, the module M1 executes the first machining step, the module M2 executes the second machining step, and the module M3 executes the third machining step to produce a desired product having a predetermined shape from a workpiece.

The multi-system program dividing part 31 is configured to separately store (record) each of the machining programs of the multi-system program stored in the multi-system program storage part 30 into the divided program storage part 32. For instance, the multi-system program is divided into machining programs per the recording areas $1, $2, and $3, and the divided machining programs are individually stored (recorded) into the divided program storage part 32.

The divided program storage part 32 includes a plurality of storage parts such as a first storage part, a second storage part, a third storage part, . . . , and an Nth storage part, for storing the divided machining programs. Thus, each of the machining programs is stored in the corresponding storage.

When a different multi-system program is input to the multi-system program storage part 30 through the program input part 23, the multi-system program storage part 30 sends the inputted multi-system program to the multi-system dividing part 31. By sequentially storing (recording) the different multi-system programs for producing different products into the multi-system program storage part 30, the machining programs of each of the different multi-system programs are individually stored in the divided program storage part 32 by the multi-system program dividing part 31.

For instance, when a multi-system program A for producing a product A through the above-mentioned three (3) steps (i.e., the first machining step, the second machining step, and the third machining step) is stored in the multi-system program storage part 30; a machining program PA1 for the first system m1, which has been recorded in the recording area $1 of the multi-system program A, is stored in the first storage part, a machining program PA2 for the second system m2, which has been recorded in the recording area S2, is stored in the second storage part, and a machining program PA3 for the third system m3, which has been recorded in the recording area $3, is stored in the third storage part.

Similarly, when a multi-system program B for producing a product B through the three (3) steps is stored in the multi-system program storage part 30; a machining program PB1 for the first system m1, which has been recorded in the recording area $1 of the multi-system program B, is stored in the fourth storage part, a machining program PB2 for the second system m2, which has been recorded in the recording area S2, is stored in the fifth storage part, and a machining program PB3 for the third system m3, which has been recorded in the recording area $3, is stored in the sixth storage part.

Further, when a multi-system program C for producing a product C through a first machining step executed by the module M1 and a second machining step executed by the module M2 is stored in the multi-system program storage part 30; a machining program PC1 for the first system m1, which has been recorded in the recording area $1 of the multi-system program C, is stored in the seventh storage part, and a machining program PC2 for the second system m2, which has been recorded in the recording area $2, is stored in the eighth storage part.

Here, the multi-system program storage part 30 is also capable of storing a single-system program for producing a product through a single machining step executed by one module. Thus, when a single-system program for producing a product D through a single machining step executed by the module M1 is stored in the multi-system program storage part 30; the multi-system program dividing part 31 stores a machining program PD1, which has been recorded in the recording area of the single-system program D, is stored in the ninth storage part.

The machining program selection part 33 selects and retrieves, from the first to nth storage parts of the divided program storage part 32, a storage part storing a desired machining program in accordance with each of the machining steps executed by the corresponding modules M1, M2, and M3. The machining program selection part 33 then stores (records) the selected machining program in the system-based program storage part 34 for each of the control systems.

The system-based program storage part 34 includes a system program storage part for each control system to store the corresponding machining program. The system-based program storage part 34 of this embodiment includes three (3) system program storage parts (a first system program storage part 34*a*, a second system program storage part 34*b*, and a third system program storage part 34*c*) each corresponding to the three (3) control systems (the first system m1, the second system m2, and the third system m3). The machining programs selected by the machining program selection part 33 are respectively stored in the system program storage parts (i.e., the first system program storage part 34*a*, the second system program storage part 34*b*, and the third system program storage part 34*c*) in accordance with the corresponding systems.

The first system program storage part 34*a* stores machining programs for the first system m1 selected and retrieved from the divided program storage part 32 by the machining program selection part 33. For instance, the first system program storage part 34*a* stores the machining program PA1 stored in the first storage part, the machining program PB1 stored in the fourth storage part, the machining program PC1 stored in the seventh storage part, and the machining program PD1 stored in the ninth storage part.

The second system program storage part 34*b* stores machining programs for the second system m2 and that are selected and retrieved from the divided program storage part 32 by the machining program selection part 33. For instance, the second system program storage part 34*b* stores the machining program PA2 stored in the second storage part, the machining program PB2 stored in the fifth storage part, and the machining program PC2 stored in the eighth storage part.

The third system program storage part 34*c* stores machining programs for the third system m2 and that are selected and retrieved from the divided program storage part 32 by the machining program selection part 33. For instance, the third system program storage part 34*c* stores the machining program PA3 stored in the third storage part and the machining program PB3 stored in the sixth storage part.

The system control part 25 of this embodiment includes three (3) system controllers (a first system controller 25*a*, a second system controller 25*b*, and a third system controller 25*c*) each corresponding to the three (3) control systems (i.e., the first system m1, the second system m2, and the third system m3) respectively. Each of the controllers independently controls the corresponding three (3) control systems.

Each of the first, second, and third system controllers 25*a*, 25*b*, and 25*c* independently controls the driving shafts assigned to the corresponding control systems (i.e., the first system m1, the second system m2, and the third system m3) based on the machining programs stored in each of the corresponding system program storage parts (i.e., the first system program storage part 34*a*, the second system program storage part 34*b*, and the third system program storage part 34*c*). In this embodiment, the first system controller 25*a* controls the module M1, the second system controller 25*b* controls the module M2, and the third system controller 25*c* controls the module M3, independently and respectively.

Next, the control to drive the modules executed by the control device 20 will be explained with reference to the following Examples 1 and 2.

EXAMPLE 1

Figure 5A:
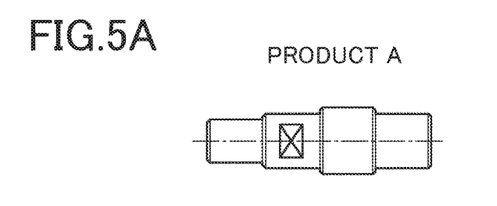
FIG. 5A is a view illustrating an example of a product having a predetermined shape produced by the machine tool of the embodiment.
Figure 5B:
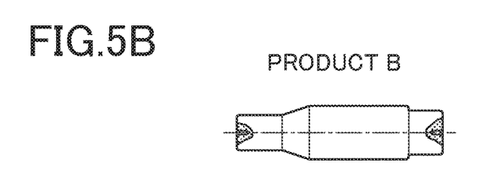
FIG. 5B is a view illustrating another example of a product having a predetermined shape produced by the machine tool of the embodiment.
Figure 6A:
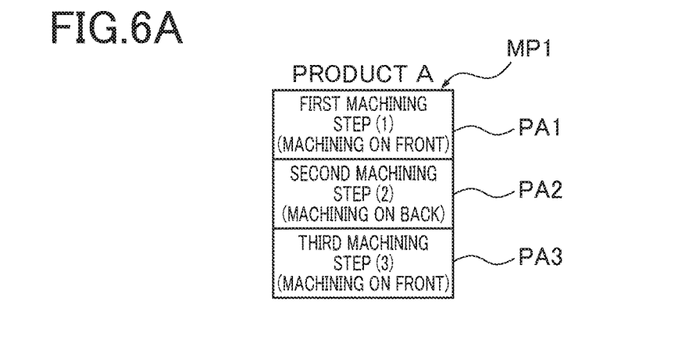
FIG. 6A is a view for showing an example of a machining step for the product A shown in FIG. 5A.

In Example 1, the modules M1, M2, and M3 of the machine tool 100 are used to produce, from a workpiece, a product A having a predetermined shape as illustrated in FIG. 5A. As shown in FIG. 6A, the product A is produced through three (3) steps consisting of: for example, a first processing (a first machining step (1)) on the front surface (i.e., on the right side of FIG. 5A), a processing (a second machining step (2)) on the back surface (i.e., on the left side of FIG. 5B), and a second processing on the front surface (a third machining step (3)). FIG. 6A to FIG. 6D schematically show machining steps together with multi-system programs and a single-system program.

Figure 7A:
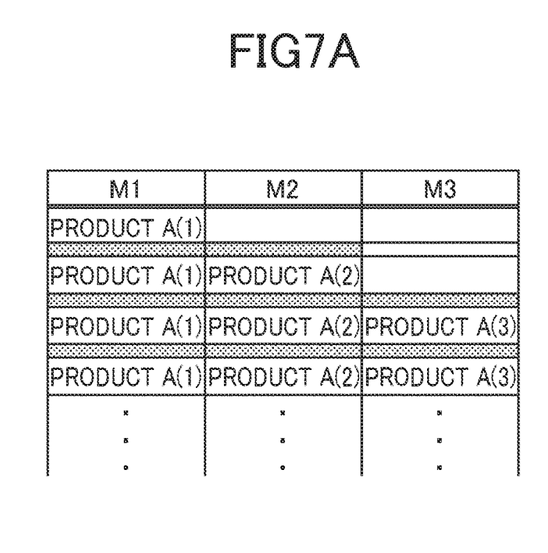
FIG. 7A is a view for showing machining steps of the modules M1, M2, and M3 in accordance with Example 1.

FIG. 7A shows an example of machining steps to produce the product A executed by the modules M1, M2, and M3 in Example 1. In FIG. 7A, the term "the product A(1)" represents the first machining step of FIG. 6A executed by the module M1, the term "the product A(2)" represents the second machining step of FIG. 6A executed by the module M2, and the term "the product A(3)" represents the third machining step of FIG. 6A executed by the module M3.

Figure 8:
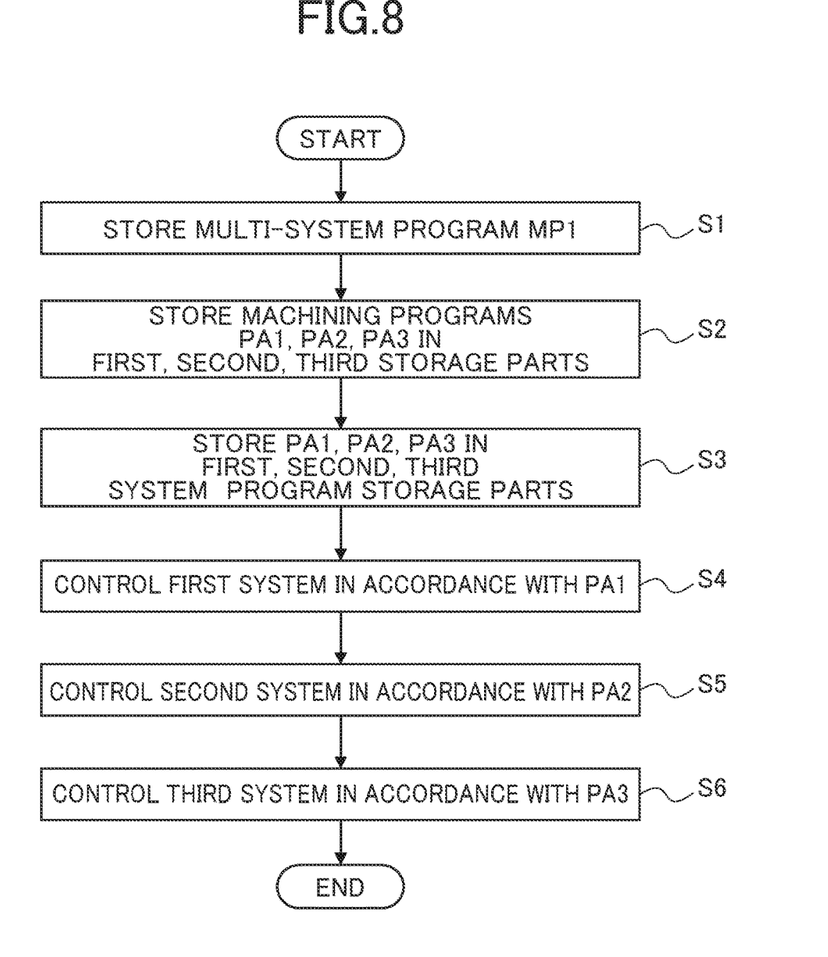
FIG. 8 is a flowchart showing a control for driving the modules executed by the control device of the machining example 1.

Next, the control to drive the modules in Example 1 will be explained with reference to FIG. 8 flowchart.

A multi-system program MP1 for producing the product A may be programmed by an external computer. As schematically illustrated in FIG. 6A, the multi-system program MP1 includes the machining program PA1, the machining program PA2, and the machining program PA3. The machining program PA1 is recorded in the recording area $1 of the multi-system program MP1 and executes the first machining step by the module M1. The machining program PA2 is recorded in the recording area $2 of the multi-system program MP1 and executes the second machining step by the module M2. The machining program PA3 is recorded in the recording area $3 of the multi-system program MP1 and executes the third machining step by the module M3. The multi-system program MP1 is stored (recorded) in the multi-system program storage part 30 through the program input part 23 (Step S1).

Once the multi-system program MP1 is stored in the multi-system program storage part 30; the multi-system program dividing part 31 stores, for example, the machining program PA1 in the first storage part of the divided program storage part 32, the machining program PA2 in the second storage part, and the machining program PA3 in the third storage part, respectively (Step S2).

The machining program selection part 33 reads out the machining program PA1 from the first storage part and stores the machining program PA1 in the first system program storage part 34a of the system-based program storage part 34. Further, the machining program selection part 33 reads out the machining program PA2 from the second storage part and stores it in the second system program storage part 34b, and reads out the machining program PA3 from the third storage part and stores it in the third system program storage part 34c (Step S3). Through this step, the module M1 executes the first machining step, the module M2 executes the second machining step, and the third module M3 executes the third machining step, as illustrated in FIG. 7A.

The first system controller 25a of the system control part 25 then controls the first system m1 in accordance with the machining program PA1 recorded in the first system program storage part 34a. Accordingly, the first system controller 25a successively executes the first machining step with module M1 on the workpiece provided thereto (Step S4).

The second system controller 25b of the system control part 25 then controls the second system m2 in accordance with the machining program PA2 recorded in the second system program storage part 34b. Accordingly, the second system controller 25b successively executes the second machining step with module M2 on the workpiece transferred from the module M1 (Step S5).

The third system controller 25c of the system control part 25 then controls the third system m3 in accordance with the machining program PA3 recorded in the third system program storage part 34c. Accordingly, the third system controller 25c successively executes the third machining step with module M3 on the workpiece transferred from the module M2 (Step S6).

As explained above, the Steps S4 to S6 are executed by the three (3) modules M1, M2, and M3 to produce the product A while transferring the workpiece for producing the product A among the modules. Besides, by repeating the Steps S4 to S6 with the three (3) modules M1, M2, and M3, it is possible to suppress and reduce an operation stop time of the modules M1, M2, and M3. As a result, it becomes possible to efficiently produce the identical products A successively and sequentially.

EXAMPLE 2

In Example 2, the modules M1, M2, and M3 of the machine tool 100 are used to produce, from workpieces, a product A, a product B, a product C, and a product D each having a different shape from each other, as illustrated in FIG. 5A to FIG. 5D.

Figure 6B:
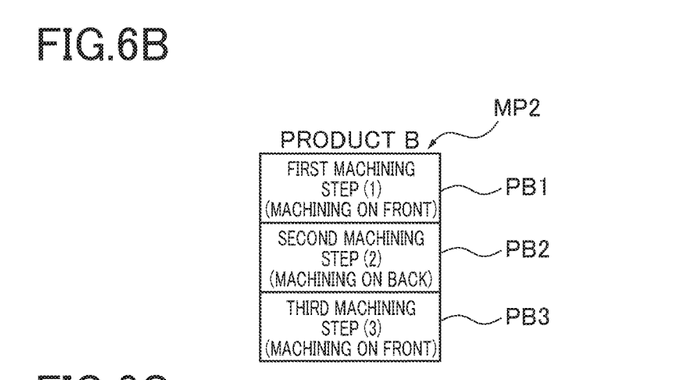
FIG. 6B is a view for showing an example of a machining step for the product B shown in FIG. 5B.

As shown in FIG. 6B, the product B is produced through three (3) steps consisting of: for example, a first processing (a first machining step (1)) on the front surface (i.e., on the right side of FIG. 5B), a processing (a second machining step (2)) on the back surface (i.e., on the left side of FIG. 5B), and a second processing on the front surface (a third machining step (3)).

Figure 5C:
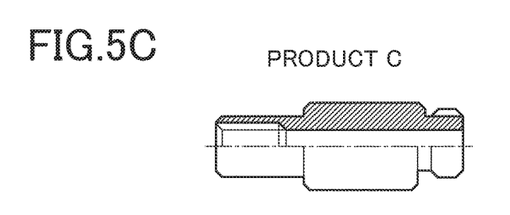
FIG. 5C is a view illustrating another example of a product having a predetermined shape produced by the machine tool of the embodiment.
Figure 6C:
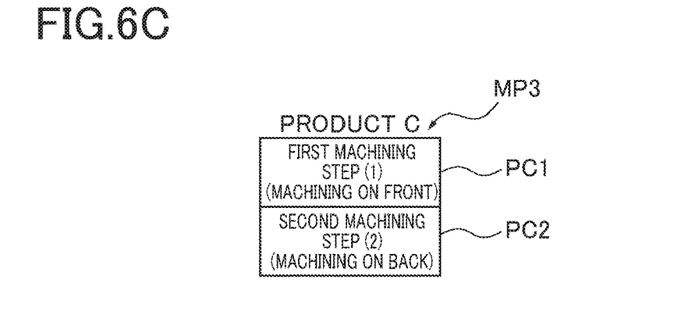
FIG. 6C is a view for showing an example of a machining step for the product C shown in FIG. 5C.

As shown in FIG. 6C, the product C is produced through two (2) steps consisting of: for example, a processing (a first machining step (1)) on the front surface (i.e., on the right side of FIG. 5C) and a processing (a second machining step (2)) on the back surface (i.e., on the left side of FIG. 5C).

Figure 5D:
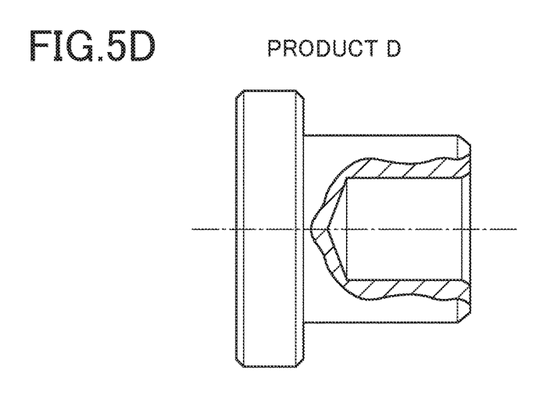
FIG. 5D is a view illustrating another example of a product having a predetermined shape produced by the machine tool of the embodiment.
Figure 6D:
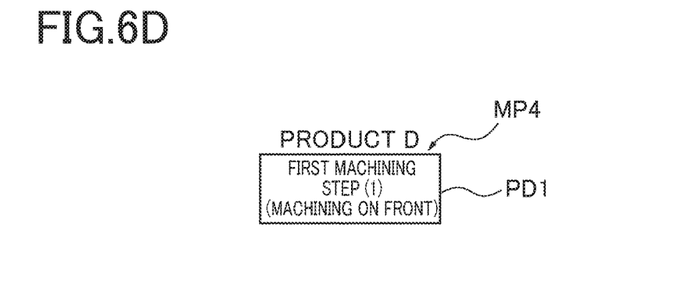
FIG. 6D is a view for showing an example of a machining step for the product D shown in FIG. 5D.

As shown in FIG. 6D, the product D is produced through one (1) step consisting of: a processing (a first machining step (1)) on the front surface (i.e. on the right side of FIG. 5D).

Figure 7B:
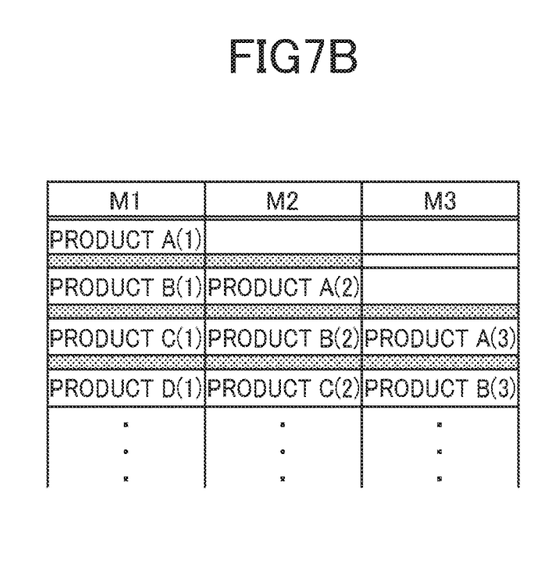
FIG. 7B is a view for showing machining steps of the modules M1, M2, and M3 in accordance with Example 2.

FIG. 7B shows an example of machining steps to produce the different products A, B, C, and D executed by the modules M1, M2, and M3 in Example 2. In FIG. 7B, the term "the product A(1)" represents the first machining step of FIG. 6A executed by the module M1, the term "the product A(2)" represents the second machining step of FIG. 6A executed by the module M2, and the term "the product A(3)" represents the third machining step of FIG. 6A executed by the module M3.

Further, in FIG. 7B, the term "the product B(1)" represents the first machining step of FIG. 6B executed by the module M1, the term "the product B(2)" represents the second machining step of FIG. 6B executed by the module M2, and the term "the product B(3)" represents the third machining step of FIG. 6B executed by the module M3. Similarly, in FIG. 7B, the term "the product C(1)" represents the first machining step of FIG. 6C executed by the module M1, and the term "the product C(2)" represents the second machining step of FIG. 6C executed by the module M2. Furthermore, in FIG. 7B, the term "the product D(1)" represents the first machining step of FIG. 6D executed by the module M1.

Figure 9A:
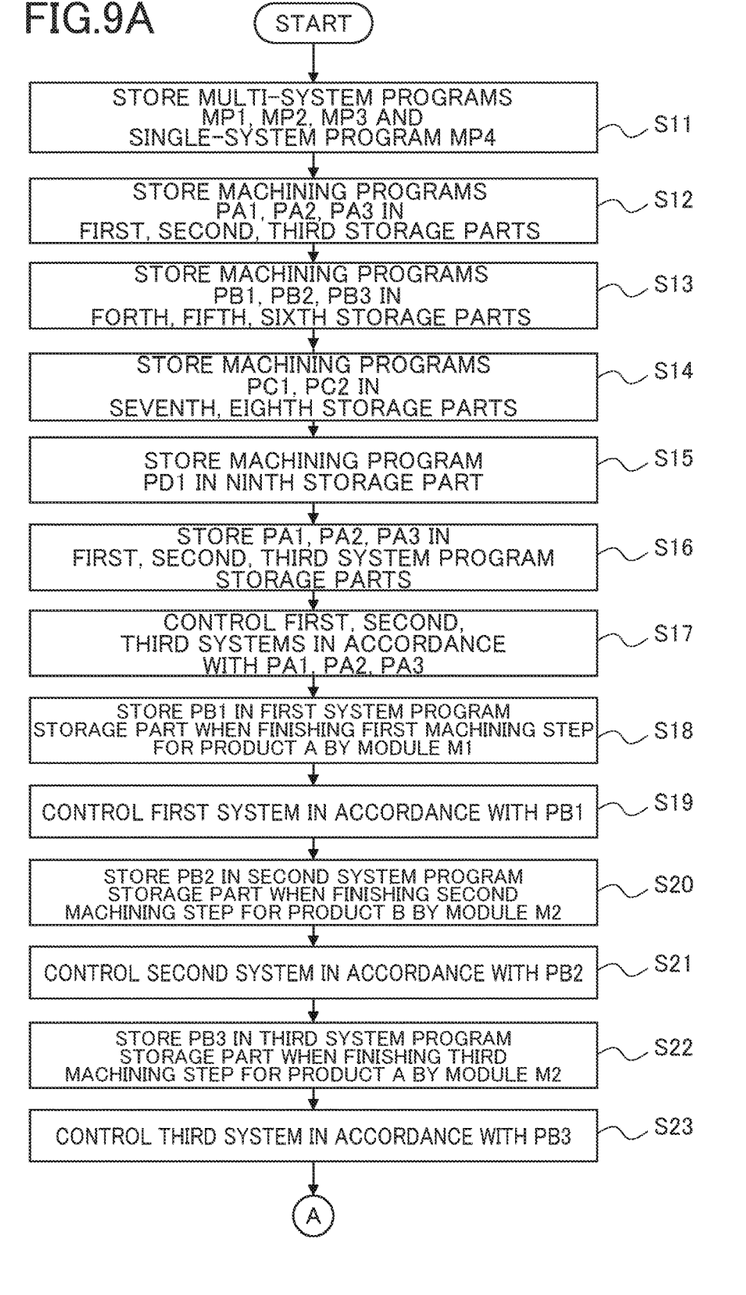
FIG. 9A is a flowchart showing a control for driving the modules executed by the control device of the machining example 2.
Figure 9B:
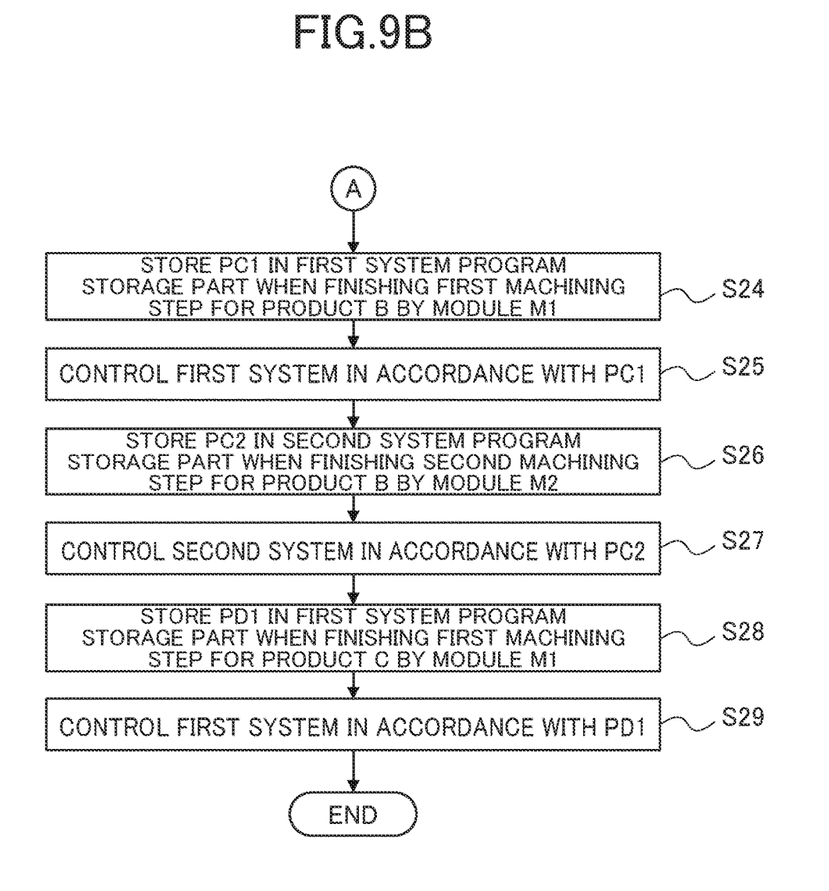
FIG. 9B is a flowchart showing a control for driving the modules executed by the control device of the machining example 2.

Next, the control to drive the modules in Example 2 will be explained with reference to flowcharts of FIG. 9A and FIG. 9B.

A multi-system program MP2 for producing the product B may be programmed by an external computer. As schematically illustrated in FIG. 6B, the multi-system program MP 2 includes the machining program PB1, the machining program PB2, and the machining program PB3. The machining program PB1 is recorded in the recording area 1 of the multi-system program MP2 and executes the first machining step by the module M1. The machining program PB2 is recorded in the recording area 2 of the multi-system program MP2 and executes the second machining step by the module M2. The machining program PB3 is recorded in the recording area S3 and executes the third machining step by the module M3.

Further, a multi-system program MP3 for producing the product C may be programmed by an external computer. As schematically shown in FIG. 6C, the multi-system program MP3 includes the machining program PC1 and the machining program PC2. The machining program PC1 is recorded in the recording area $1 of the multi-system program MP3 and executes the first machining step by the module M1. The machining program PC2 is recorded in the recording area $2 of the multi-system program MP3 and executes the second machining step by the module M2.

Further, a single-system program MP4 for producing the product D may be programmed by an external computer. As schematically shown in FIG. 6D, the single-system program MP4 includes the machining program PD1 which executes a machining step by the module M1.

Here, the multi-system program MP1 for producing the product A is identical to that of the Example 1, and thus the detailed explanation will be omitted.

The multi-system programs MP1, MP2, and MP3, and the single-system program MP4 are stored (recorded) in the multi-system program storage part 30 through the program input part 23 (Step S11).

Once the multi-system programs MP1, MP2, and MP3, and the single-system program MP4 are stored in the multi-system program storage part 30; the multi-system program dividing part 31 stores, for example, the machining program PA1 of the multi-system program MP1 in the first storage part of the divided program storage part 32, the machining program PA2 thereof in the second storage part, and the machining program PA3 thereof in the third storage part, respectively (Step S12).

Similarly, the multi-system program dividing part 31 stores, for example, the machining program PB1 of the multi-system program MP2 in the fourth storage part of the divided program storage part 32, the machining program PB2 thereof in the fifth storage part, and the machining program PB3 thereof in the sixth storage part, respectively (Step S13).

Further, the multi-system program dividing part 31 stores, for example, the machining program PC1 of the multi-system program MP3 in the seventh storage part of the divided program storage part 32 and the machining program PC2 thereof in the eighth storage part, respectively (Step S14).

Furthermore, the multi-system program dividing part 31 stores, for example, the machining program PD1 of the single-system program MP4 in the ninth storage part of the divided program storage part 32 (Step S15).

As shown in FIG. 7B, the first machining steps for the product A, the product B, the product C, and the product D are executed by the module M1, the second machining steps for the product A, the product B, and the product C are executed by the module M2, and the third machining steps for the product A and the product B are executed by the module M3. Accordingly, the machining program selection part 33 reads out the machining program PA1 from the first storage part and stores the machining program PA1 in the first system program storage part 34a of the system-based program storage part 34. Further, the machining program selection part 33 reads out the machining program PB1 from the second storage part and stores it in the second system program storage part 34b, and reads out the machining program PA3 from the third storage part and stores it in the third system program storage part 34c (Step S16).

The first system controller 25a of the system control part 25 then controls the first system m1 in accordance with the machining program PA1 stored in the first system program storage part 34a so as to execute the first machining step by the module M1 on the provided workpiece. Further, the second system controller 25b of the system control part 25 controls the second system m2 in accordance with the machining program PA2 stored in the second system program storage part 34b so as to execute the second machining step by the module M2 on the workpiece transferred from the module M1. Similarly, the third system controller 25c of the system control part 25 controls the third system m3 in accordance with the machining program PA3 stored in the third system program storage part 34c so as to execute the third machining step by the module M3 on the workpiece transferred from the module M2 (Step S17).

As explained above, the three (3) modules M1, M2, and M3 transfer and receives the workpiece sequentially among the modules to produce the product A.

Additionally, when the first machining step for the product A executed by the module M1 is finished, the machining program selection part 33 reads out the machining program PB1 from the fourth storage part of the divided program storage part 32 and stores the machining program PB1 in the first system program storage part 34a (Step S18).

The first system controller 25a of the system control part 25 then controls the first system m1 in accordance with the machining program PB1 stored in the first system program storage part 34a (Step S19). Therefore, the first machining step for the product B is executed by the module M1 in parallel with the second machining step for the product A executed by the module M2.

Further, when the second machining step for the product A executed by the module M2 is finished, the machining program selection part 33 reads out the machining program PB2 from the fifth storage part of the divided program storage part 32 and stores the machining program PB2 in the second system program storage part 34b (Step S20).

The second system controller 25b of the system control part 25 then controls the second system m2 in accordance with the machining program PB2 stored in the second system program storage part 34b (Step S21). Therefore, the second machining step for the product B is executed by the module M2 in parallel with the third machining step for the product A executed by the module M3.

Further, when the third machining step for the product A executed by the module M3 is finished, the machining program selection part 33 reads out the machining program PB3 from the sixth storage part of the divided program storage part 32 and stores the machining program PB3 in the third system program storage part 34c (Step S22).

The third system controller 25c of the system control part 25 then controls the third system m3 in accordance with the machining program PB3 stored in the third system program storage part 34c (Step S23). Therefore, the third machining step for the product B is executed by the module M3 after the third machining step for the product A.

Further, when the first machining step for the product B executed by the module M1 is finished, the machining program selection part 33 stores the machining program PC1 in the first system program storage part 34a (Step S24).

The first system controller 25a of the system control part 25 then controls the first system m1 in accordance with the machining program PC1 stored in the first system program storage part 34a (Step S25). Therefore, the first machining step for the product C is executed by the module M1 in parallel with the second machining step for the product B executed by the module M2.

Further, when the second machining step for the product B executed by the module M2 is finished, the machining program selection part 33 stores the machining program PC2 in the second system program storage part 34b (Step S26).

The second system controller 25b of the system control part 25 then controls the second system m2 in accordance with the machining program PC2 stored in the second system program storage part 34b (Step S27). Therefore, the second machining step for the product C is executed by the module M2 in parallel with the third machining step for the product B executed by the module M3.

Further, when the first machining step for the product C executed by the module M1 is finished, the machining program selection part 33 stores the machining program PD1 in the first system program storage part 34a (Step S28).

The first system controller 25a of the system control part 25 then controls the first system m1 in accordance with the machining program PD1 stored in the first system program storage part 34a (Step S29). Therefore, the first machining step for the product D is executed by the module M1 in parallel with the second machining step for the product C executed by the module M2 as well as the third machining step for the product B executed by the module M3.

As explained above, when producing the product A, the product B, the product C, and the product D having different shapes from each other, it is possible to suppress and reduce an operation stop time of the modules M1, M2, and M3 by repeating the above-mentioned Steps S17 to S29 with the three (3) modules M1, M2, and M3. As a result, it becomes possible to efficiently produce the different products A, B, C, and D successively and sequentially.

The above embodiment is applied to a machine tool including two fixed modules M1 and M3 and one moving module M2. However, a machine tool of this invention should not be limited thereto. Instead, the machine tool of this invention may include one fixed module or three or more fixed modules and one moving module or two or more moving modules.

In the control device for a machine tool according to the present invention, the machining programs contained in each of the plurality of multi-system program are each stored in the respective divided program storage parts, a predetermined machining program is selected, in accordance with the machining step executed by each of the modules, for each control system from the machining programs stored in the divided program storage parts, and the selected machining program is stored in the respective system-based program storage parts. Accordingly, each of the modules is driven in accordance with the corresponding machining program for each system, thereby enabling the machine tool to produce a plurality of different-shaped products efficiently and successively.

What is claimed is:

1. A control device for a machine tool capable of producing a plurality of differently-shaped products from a plurality of workpieces, the machine tool comprising a plurality of modules each integrally including a workpiece gripper that grips a workpiece and an operation-part holder that holds an operation part configured to perform a predetermined operation on the workpiece gripped by the workpiece gripper, the control device comprising:

a plurality of control systems that are configured to control a driving shaft of each of the plurality of modules, the control device controlling the machine tool to machine the workpiece in accordance with a plurality of multi-system programs, each of the multi-system programs including a plurality of machining programs which respectively correspond to the plurality of control systems, the plurality of multi-system programs controlling the plurality of modules to produce one of the plurality of differently-shaped products, the driving shaft of each of the plurality of modules being assigned to each of the plurality of control systems, and each of the plurality of multi-system programs being executed to machine the workpiece into a shaped product of the plurality of shaped products;

a divided program storage part that is configured to individually store the machining programs;

a system-based program storage part that is configured to store each of the machining programs for a respective control system; and a machining program selection part that is configured to select and retrieve a desired machining program from the divided program storage part in accordance with a machining step to be executed by each of the plurality of modules and to store the desired machining program in the system-based program storage part for the respective control system, wherein the machining program selection part selects and retrieves the desired machining program for each control system from the divided program storage part and stores the desired machining program in the system-based program storage part for the respective control system such that each of the plurality of modules of the machine tool independently executes a predetermined machining step to machine the workpiece that is gripped by the workpiece gripper of a respective module into the one of the plurality of differently-shaped products, wherein the plurality of modules includes at least two fixed modules disposed in parallel to each other and at least one moving module disposed to face the fixed modules and provided to be movable in an aligned direction of the at least two fixed modules, wherein the at least two fixed modules are unmovable in the aligned direction of the at least two fixed modules, and wherein the moving module is capable of transferring the workpiece between the at least two fixed modules.

2. The control device according to claim 1, wherein the plurality of modules are configured to sequentially transfer and receive the plurality of workpieces to and from each other.

3. The control device according to claim 1, wherein the system-based program storage part comprises a storage part for each control system.

4. The control device according to claim 1, wherein the plurality of control systems are configured to control the plurality of modules to successively machine the plurality of workpieces.

5. The control device according to claim 1, wherein the plurality of control systems are configured to control the plurality of modules to machine the plurality of workpieces in parallel.

6. The control device according to claim 1, further comprising:

a multi-system program storage part that is configured to store the plurality of multi-system programs; and a multi-system program dividing part that is configured to divide each of the plurality of multi-system programs into the machining programs.

7. The control device according to claim 6, wherein the plurality of multi-system programs are programmed by an at least one of an external computer and an operation panel.

* * * * *